(12) United States Patent
Lin et al.

(10) Patent No.: US 9,857,522 B2
(45) Date of Patent: Jan. 2, 2018

(54) LIGHT GUIDING CONFIGURATION, BACKLIGHT MODULE AND DISPLAY DEVICE

(71) Applicant: HON HAI PRECISION INDUSTRY CO., LTD., New Taipei (TW)

(72) Inventors: Chang-Ting Lin, New Taipei (TW); Shih-Pin Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 249 days.

(21) Appl. No.: 14/833,736

(22) Filed: Aug. 24, 2015

(65) Prior Publication Data

US 2016/0349427 A1    Dec. 1, 2016

(30) Foreign Application Priority Data

May 25, 2015   (TW) .............................. 104116672 A

(51) Int. Cl.
*F21V 8/00*        (2006.01)
(52) U.S. Cl.
CPC ........... *G02B 6/005* (2013.01); *G02B 6/0088* (2013.01)

(58) Field of Classification Search
CPC .............................. G02B 6/005; G02B 6/0088
See application file for complete search history.

(56) References Cited

U.S. PATENT DOCUMENTS

2012/0113672 A1* 5/2012 Dubrow ................. B82Y 20/00
362/602

\* cited by examiner

*Primary Examiner* — Mary Ellen Bowman
(74) *Attorney, Agent, or Firm* — ScienBiziP, P.C.

(57) ABSTRACT

A backlight module can include a light guiding board, a light source located at a side of the light guiding board, a package layer coupled to light guiding board, and a quantum dots layer located between the light guiding board and the package layer. The light guiding board can include a light entering face and a light exiting face. The light source is facing the light entering face of the light guiding board. The light source being is configured to provide light to the light entering face of the light guiding board. The quantum dots layer is adjacent to the light exiting face of the light guiding board. The light guiding board and the package layer cooperative define a receiving room receiving the quantum dots layer on the light guiding board.

20 Claims, 6 Drawing Sheets

LIGHT GUIDING CONFIGURATION, BACKLIGHT MODULE AND DISPLAY DEVICE

FIELD

The subject matter herein generally relates to optical devices, particularly relates to a display device including a backlight module having a light guiding configuration.

BACKGROUND

A light guiding configuration can be used in conjunction with the backlight module another illumination device to realize display effect or illumination effect. Electronic devices are often equipped with a display device. In order to illuminate the information on the display, a backlight can be provided. The backlight can be a part of the display.

BRIEF DESCRIPTION OF THE DRAWINGS

Implementations of the present technology will now be described, by way of example only, with reference to the attached figures.

DETAILED DESCRIPTION

Figure 1:
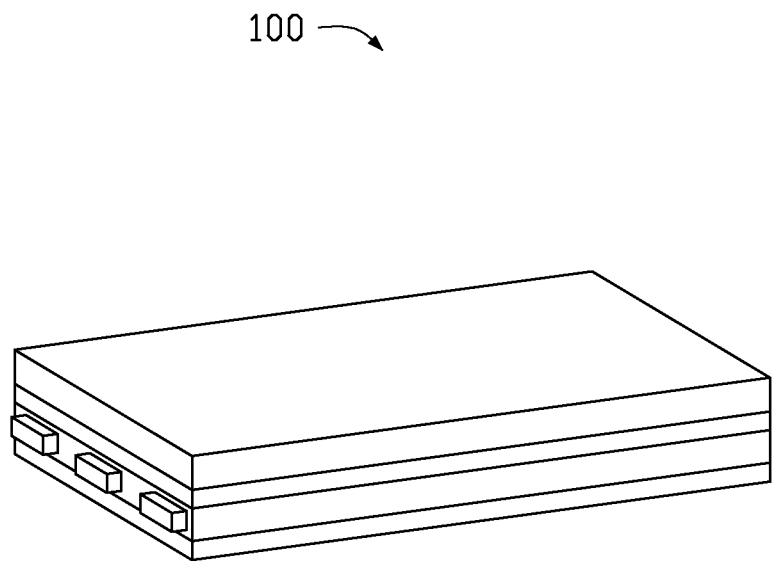
FIG. 1 is an isometric view of a display device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a backlight module. The backlight module can include a light guiding board, a light source located at a side of the light guiding board and a package layer coupled to light guiding board. The light guiding board can include a light entering face and a light exiting face. The light source is facing the light entering face of the light guiding board. The light source being is configured to emit light to the light entering face of the light guiding board. The light guiding board and the package layer cooperative define a receiving room receiving a quantum dots layer on the light guiding board.

The present disclosure is described further in relation to a light guiding configuration. The light guiding configuration can include a light guiding board comprising a light entering face and a light exiting face, a quantum dots layer located at a side of the light exiting face of the light guiding board, and a package layer coupled to light guiding board. The light guiding board and the package layer cooperative define a receiving room receiving the quantum dots layer between the package layer and the light guiding board.

The present disclosure is described further in relation to a display device. The display device can include a light source configured to provide light, a light guiding board configured to guiding the light from the light source, a quantum dots layer located at a side of the light guiding board, a package layer coupled to light guiding board and enclosing the quantum dots layer on the light guiding board, and a display panel located at a side of the package layer, and configured to receive the light passing through the light guiding board, the quantum dots layer and the package layer. The light guiding board includes a light entering face facing the light source and a light exiting face. The quantum dots layer is located at a side of the light exiting face of the light guiding board.

FIG. 1 illustrates a display device 100 of an embodiment of the present disclosure. The display device 100 can be a display screen of a smart phone, tablet personal computer, camera, notebook computer or other electronic device.

Figure 2:
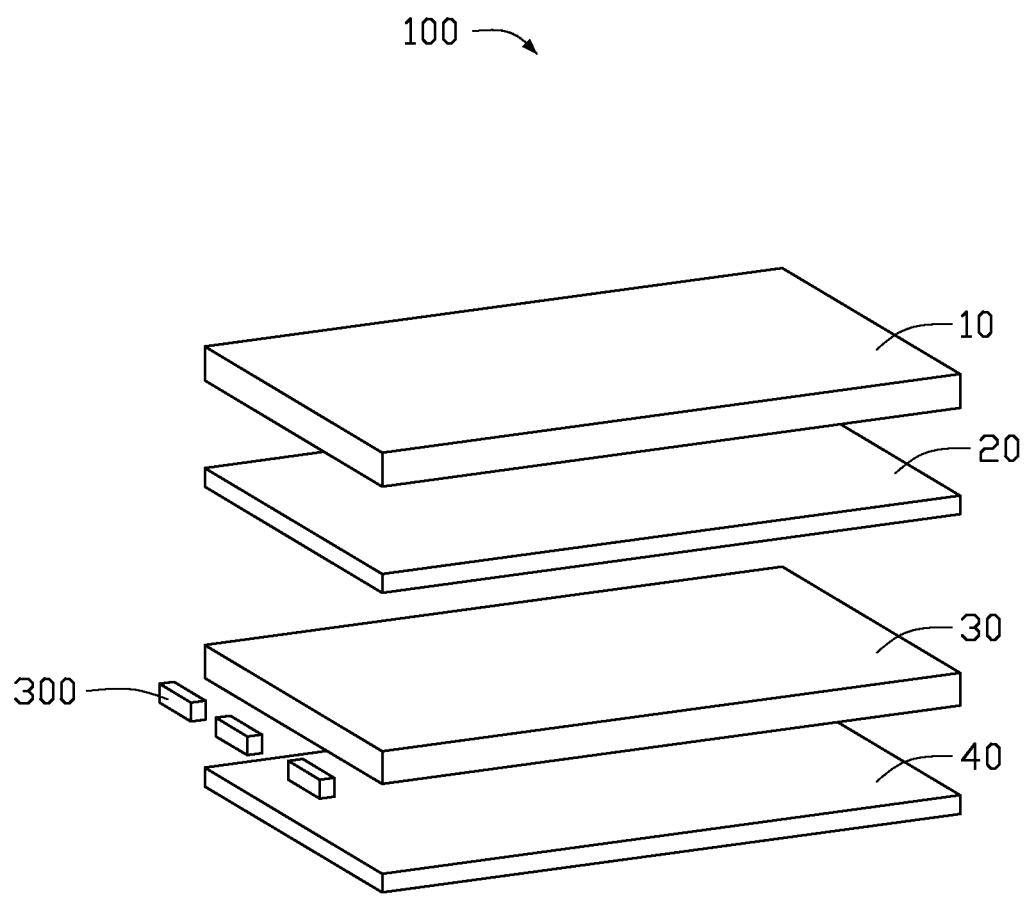
FIG. 2 is an exploded, isometric view of the display device of FIG. 1.

FIG. 2 illustrates an exploded view of a display device 100 and that the display device 100 can include a display panel 10, an optical diaphragm structure 20, a backlight module 30, and a reflective structure 40 arranged in a top-to-bottom sequence.

The display panel 10 can be a liquid crystal display panel. The backlight module 30 can include a light source 300 configured to provide light for display. The optical diaphragm structure 20 is located between the display panel 10 and the backlight module 30. The optical diaphragm structure 20 is configured to process the light from the light source 300 before the light enters the display panel 10, for realizing a better display effect. The optical diaphragm structure 20 can include at least a brightness enhancement film. In at least one embodiment, the optical diaphragm structure 20 can include a brightness enhancement film and a dual brightness enhancement film. In at least one embodiment, the optical diaphragm structure 20 can be a part of the backlight module 30. The reflective structure 40 is located at a side of the backlight module 30 remote from the display panel 10, and configured to reflect the light leaking from the backlight module 30 to the display panel 10. The reflective structure 40 can be an enhanced specular reflector.

Figure 3:
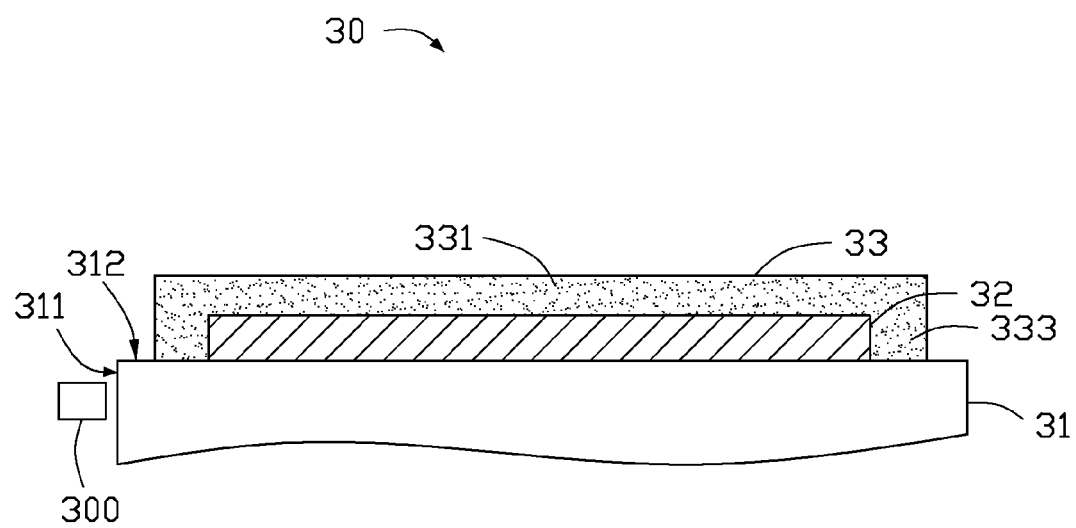
FIG. 3 is a diagrammatic view of a first embodiment of a backlight module of the display device of FIG. 2.

FIG. 3 illustrates that the backlight module 30 can include the light source 30 and a light guiding configuration configured to guide the light from the light source 300 to the optical diaphragm structure 20 and the display panel 10. The light guiding configuration can include a light guiding board 31, a quantum dots layer 32 stacked on the light guiding board 31 and a package layer 33 positioned on the light guiding board 31. The quantum dots layer 32 is located between the light guiding board 31 and the package layer 33.

The light guiding board 31 can include a light entering face 311 and a light exiting face 312 adjacent to the light entering face 311. The light exiting face 312 can be perpendicular to the light entering face 311. In at least one embodiment, the quantum dots layer 32 and the package layer 33 can be a part of the light guiding board 31, that is to say, the light guiding board 31, the quantum dots layer 32 and the package layer 33 can be an integral one for guiding the light from the light source 300 to the optical diaphragm structure 20.

The light source 300 of the backlight module 30 is located adjacent to and at a lateral side of the light guiding board 31. The light source 300 is facing the light entering face 311 of the light guiding board 31. The quantum dots layer 32 is located at a side of the light exiting face 312 of the light guiding board 31. The quantum dots layer 32 can be in direct physical contact with the light exiting face 312. The quantum dots layer 32 can be a quantum dots enhancement film which enhances brightness of the backlight module 30 by using luminescence properties of quantum dots of the quantum dots layer 32.

The package layer 33 is located on and covers the quantum dots layer 32, for protecting the quantum dots layer 32. The package layer 33 can include a main portion 331 and a periphery portion 333 depending from a periphery edge of the main portion 331. The main portion 331 is located on the quantum dots layer 20. The periphery portion 333 is surrounding the quantum dots layer 32 on the light exiting face 312 of the light guiding board 31. The periphery portion 333 of the package layer 33 is coupled to the light guiding board 31. In at least one embodiment, the periphery portion 333 of the package layer 33 is in direct physical contact with the light exiting face 312 of the light guiding board 31. The light guiding board 31 and the package layer 33 cooperatively define a receiving room receiving the quantum dots layer 32 therein. In at least one embodiment, the package layer 33 entirely encloses the quantum dots layer 32 on the light exiting face 312 of the light guiding board 31. A periphery part of the light exiting face 312 of the light guiding board 31 is not covered by the quantum dots layer 32 and the package layer 33, and is exposed outwardly beyond the quantum dots layer 32 and the package layer 33.

The package layer 33 can be made of package material of thin film. The package layer 33 can have a thickness in a range from about 3 micrometers to about 5 micrometers. The quantum dots layer 32 can has a thickness no more than about 100 micrometers.

When the display device 100 is assembled, the light source 300 is facing the light entering face 311 of the light guiding board 31 of the backlight module 30, and is configured to provide light to the light entering face 311. The light guiding board 31 can be stacked on the light reflective structure 40 and is configured to reflect the light which exits the light guiding board 31 toward the reflective structure 40 to enter the light guiding board 31 again. The optical diaphragm structure 20 is stacked on the package layer 33 of the backlight module 30. The light exiting face 312 of the light guiding board 31 is facing the optical diaphragm structure 20. The display panel 10 can be stacked on the optical diaphragm structure 20 and is configured to receive the light from the light source 300 passing through the light guiding board 31, the quantum dots layer 32, the package layer 33, and the optical diaphragm structure 20.

Figure 4:
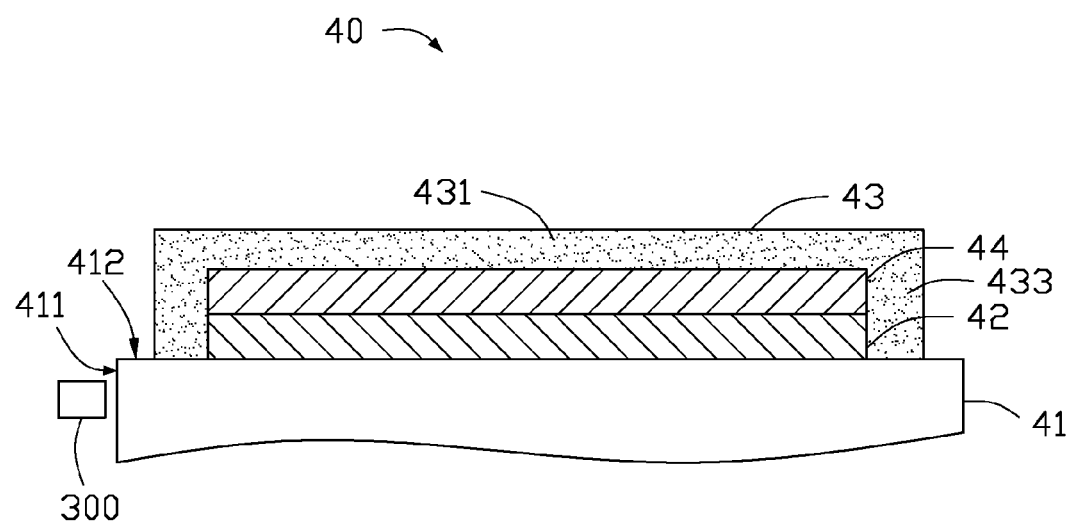
FIG. 4 is a diagrammatic view of a second embodiment of a backlight module replacing a backlight module of the display device of FIG. 2.

FIG. 4 illustrates a second embodiment of a backlight module 40 which can replace the backlight module 30. The backlight module 40 can include the light source 300 and a light guiding configuration. The light guiding configuration can include a light guiding board 41, a quantum dots layer 42 stacked on the light guiding board 41, a package layer 43 positioned on the light guiding board 41, and an isolating layer 44 located between the quantum dots layer 42 and the package layer 43. The quantum dots layer 42 is located between the light guiding board 41 and the isolating layer 44.

The light guiding board 41 can include a light entering face 411 and a light exiting ace 412 adjacent to the light entering face 411. In at least one embodiment, the quantum dots layer 42, the package layer 43 and the isolating layer 44 can be a part of the light guiding board 41, that is to say, the light guiding board 41, the quantum dots layer 42, the package layer 43 and the isolating layer 44 can be an integral one for guiding the light from the light source 300 to the optical diaphragm structure 20.

The light source 300 of the backlight module 40 is located at a lateral side of the light guiding board 41. The light source 300 is facing the light entering face 411 of the light guiding board 41. The quantum dots layer 42 is located at a side of the light exiting face 412 of the light guiding board 41. The quantum dots layer 42 can be in direct physical contact with the light exiting face 412. The quantum dots layer 42 can be a quantum dot enhancement film which enhances brightness of the backlight module 40 by using luminescence properties of quantum dots of the quantum dots layer 42.

The isolating layer 44 is located on and covers a face of the quantum dots layer 42 remote from the light guiding board 41. The isolating layer 44 is configured to protect the quantum dots layer 42. The isolating layer 44 is stacked on the quantum dots layer 42 and has a lateral periphery face thereof flushing with a lateral periphery face of the quantum dots layer 42.

The package layer 43 is located on and covers the isolating layer 44 and the quantum dots layer 42, for protecting the quantum dots layer 42 and the isolating layer 44. The package layer 43 can include a main portion 431 and a periphery portion 433 depending from a periphery edge of the main portion 431. The main portion 431 is located on the isolating layer 44. The periphery portion 433 is surrounding the isolating layer 44 and the quantum dots layer 43 on the light guiding board 41. The periphery portion 433 of the package layer 43 is coupled to the light guiding board 41. In at least one embodiment, a bottom face of the periphery portion 433 of the package layer 43 is in direct physical contact with the light exiting face 412 of the light guiding board 41. The light guiding board 41 and the package layer 43 cooperatively define a receiving room receiving the quantum dots layer 42 and the isolating layer 44 therein. In at least one embodiment, the package layer 43 entirely encloses the isolating layer 44 and the quantum dots layer 42 on the light guiding board 41. A periphery part of the light exiting face 412 of the light guiding board 41 is not covered by the quantum dots layer 42 and the package layer 43, and exposed outwardly beyond the quantum dots layer 42 and the package layer 43.

The package layer 43 can be made of package material of thin film. The package layer 43 can have a thickness in a range from about 4 micrometers to about 5 micrometers. The quantum dots layer 42 can have a thickness no more than about 100 micrometers. The isolating layer 44 can be an isolating film, and has a thickness no more than about 55 micrometers.

Figure 5:
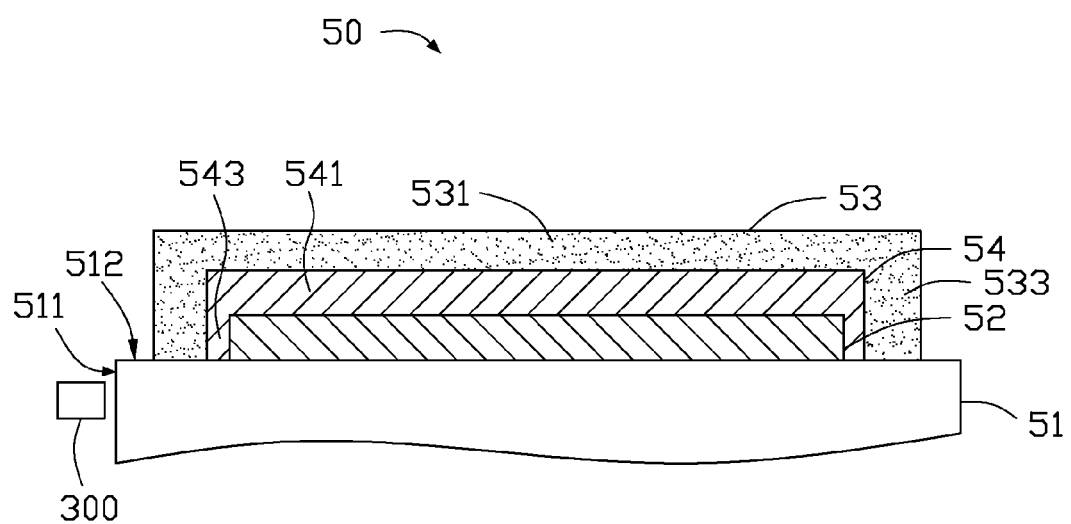
FIG. 5 is a diagrammatic view of a third embodiment of a backlight module replacing a backlight module of the display device of FIG. 2.

FIG. 5 illustrates a third embodiment of a backlight module 50 which can replace the backlight module 30 in the first embodiment. The backlight module 50 can include the light source 300 and a light guiding configuration. The light guiding configuration can include a light guiding board 51, a quantum dots layer 52 stacked on the light guiding board 51, a package layer 53 positioned on the light guiding board 51, and an isolating layer 54 located between the quantum dots layer 52 and the package layer 53. The quantum dots layer 52 is located between the light guiding board 51 and the isolating layer 54.

The light guiding board 51 can include a light entering face 511 and a light exiting ace 512 adjacent to the light entering face 511. In at least one embodiment, the quantum dots layer 52, the package layer 53 and the isolating layer 54 can be a part of the light guiding board 51, that is to say, the light guiding board 51, the quantum dots layer 52, the package layer 53 and the isolating layer 54 can be an integral one for guiding the light from the light source 300 to the optical diaphragm structure 20.

The light source 300 of the backlight module 50 is located at a lateral side of the light guiding board 51. The light source 300 is facing the light entering face 511 of the light guiding board 51. The quantum dots layer 52 is located at a side of the light exiting face 512 of the light guiding board 51. The quantum dots layer 52 can be in direct physical contact with the light exiting face 512. The quantum dots layer 52 can be a quantum dot enhancement film which enhances brightness of the backlight module 50 by using luminescence properties of quantum dots of the quantum dots layer 52.

The isolating layer 54 is located on and covers a face of the quantum dots layer 52 remote from the light guiding board 51; the isolating layer 54 is configured to protect the quantum dots layer 52. The isolating layer 54 can include a main portion 541 and a periphery portion 543 depending from a periphery edge of the main portion 541. The main portion 541 is stacked on the quantum dots layer 52. The periphery portion 543 is surrounding the quantum dots layer 52 on the light guiding board 51. The periphery portion 543 of the isolating layer 54 is coupled to the light guiding board 51. In at least one embodiment, a bottom face of the periphery portion 543 of the isolating layer 54 is in direct physical contact with the light exiting face 512 of the light guiding board 51. The light guiding board 51 and the isolating layer 54 cooperatively define a receiving space receiving the quantum dots layer 52 therein. In at least one embodiment, the isolating layer 54 entirely encloses the quantum dots layer 52 on the light guiding board 51.

The package layer 53 is located on and covers the isolating layer 54 and the quantum dots layer 52, for protecting the quantum dots layer 52 and the isolating layer 54. The package layer 53 can include a main portion 531 and a periphery portion 533 depending from a periphery edge of the main portion 531. The main portion 531 of the package layer 53 is stacked on the main portion 541 of the isolating layer 54. The periphery portion 533 of the package layer 53 is surrounding the periphery portion 543 of the isolating layer 54 and the quantum dots layer 53 on the light guiding board 51. The periphery portion 533 of the package layer 53 is coupled to the light guiding board 51. In at least one embodiment, a bottom face of the periphery portion 533 of the package layer 53 is in direct physical contact with the light exiting face 512 of the light guiding board 51. The periphery portion 543 of the isolating layer 54 is located between the periphery portion 531 of the package layer 53 and the quantum dots layer 52. The light guiding board 51 and the package layer 53 cooperatively define a receiving room receiving the quantum dots layer 52 and the isolating layer 54 therein. In at least one embodiment, the package layer 53 entirely encloses the isolating layer 54 and the quantum dots layer 52 on the light guiding board 51. A periphery part of the light exiting face 512 of the light guiding board 51 is not covered by the quantum dots layer 52 and the package layer 53, and exposed outwardly beyond the quantum dots layer 52 and the package layer 53.

The package layer 53 can be made of package material of thin film. The package layer 53 can have a thickness in a range from about 5 micrometers to about 5 micrometers. The quantum dots layer 52 can have a thickness no more than about 100 micrometers. The isolating layer 54 can be an isolating film, and has a thickness no more than about 54 micrometers.

Figure 6:
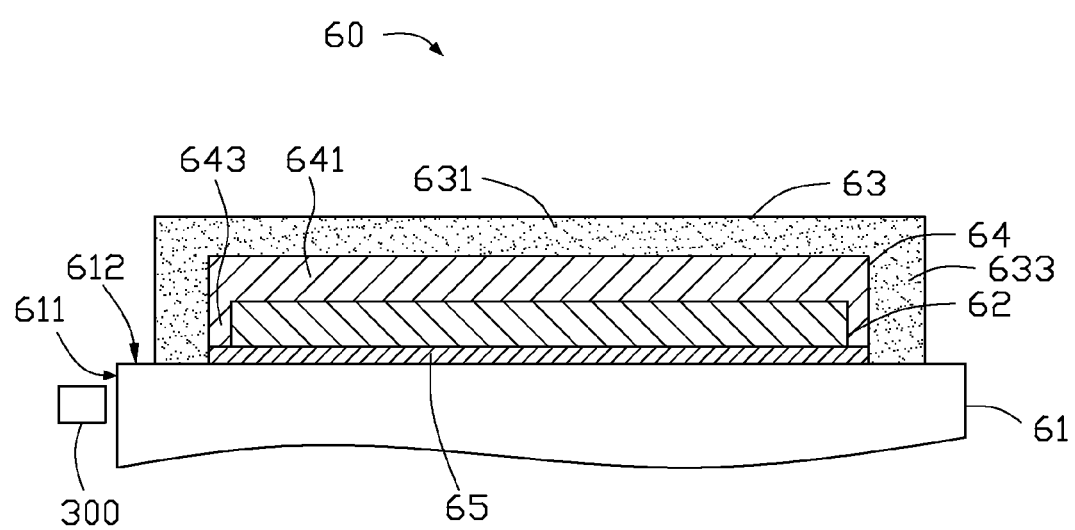
FIG. 6 is a diagrammatic view of a fourth embodiment of a backlight module replacing a backlight module of the display device of FIG. 2.

FIG. 6 illustrates a fourth embodiment of a backlight module 60 which can replace the backlight module 30 in the first embodiment. The backlight module 60 can include the light source 30 and a light guiding configuration. The light guiding configuration can include a light guiding board 61, a quantum dots layer 62 positioned on the light guiding board 61, a package layer 63 positioned on the light guiding board 61, a first isolating layer 64 located between the quantum dots layer 62 and the package layer 63, and a second isolating layer 65 located between the light guiding board 61 and the quantum dots layer 62. The quantum dots layer 62 is located between the first isolating layer 64 and the second isolating layer 65.

The light guiding board 61 can include a light entering face 611 and a light exiting ace 612 adjacent to the light entering face 611. In at least one embodiment, the quantum dots layer 62, the package layer 63 and the first isolating layer 64 and the second isolating layer 65 can be a part of the light guiding board 61, the light guiding board 61, the quantum dots layer 62, the package layer 63 the first isolating layer 64 and the isolating layer 65 can be an integral one for guiding the light from the light source 300 to the optical diaphragm structure 20.

The light source 300 of the backlight module 60 is located at a lateral side of the light guiding board 61. The light source 300 is facing the light entering face 611 of the light guiding board 61. The quantum dots layer 62 is located at a side of the light exiting face 612 of the light guiding board 61. The quantum dots layer 62 can be in direct physical contact with the second isolating layer 65 which is coupled to light exiting face 612 of the light guiding board 61. The quantum dots layer 62 can be a quantum dot enhancement film which enhances brightness of the backlight module 60 by using luminescence properties of quantum dots of the quantum dots layer 62.

The first isolating layer 64 is located on and covers a face of the quantum dots layer 62 remote from the light guiding board 61, the first isolating layer 64 is configured to protect the quantum dots layer 62. The first isolating layer 64 can include a main portion 641 and a periphery portion 643 depending from a periphery edge of the main portion 641. The main portion 641 is stacked on the quantum dots layer 62. The periphery portion 643 is surrounding the quantum dots layer 62 on the second isolating layer 65. The periphery portion 643 of the first isolating layer 64 is coupled to the second isolating layer 65. In at least one embodiment, a bottom face of the periphery portion 643 of the first isolating layer 64 is in direct physical contact with the second isolating layer 65. The first isolating layer 64 and the second isolating layer 65 cooperatively define a receiving space receiving the quantum dots layer 62 therein. In at least one embodiment, the first isolating layer 64 entirely encloses the quantum dots layer 62 on the second isolating layer 64.

The package layer 63 is located on and covers the isolating layer 64 and the quantum dots layer 62, for protecting the quantum dots layer 62 and the isolating layer 64. The package layer 63 can include a main portion 631 and a periphery portion 633 depending from a periphery edge of the main portion 631. The main portion 631 of the package layer 63 is stacked on the main portion 641 of the first isolating layer 64. The periphery portion 633 of the package layer 63 is surrounding the periphery portion 643 of the first isolating layer 64 and the quantum dots layer 63 on the light guiding board 61. The periphery portion 633 of the package layer 63 is coupled to the light guiding board 61. In at least one embodiment, a bottom face of the periphery portion 633 of the package layer 63 is in direct physical contact with the light exiting face 612 of the light guiding board 61. The periphery portion 643 of the first isolating layer 64 is located between the periphery portion 631 of the package layer 63 and the quantum dots layer 62. The light guiding board 61 and the package layer 63 cooperatively define a receiving room receiving the quantum dots layer 62, the first isolating layer 64 and the second isolating layer 65 therein. In at least one embodiment, the package layer 63 entirely encloses the first isolating layer 64, the quantum dots layer 62 and the second isolating layer 65 on the light guiding board 61. A periphery part of the light exiting face 612 of the light guiding board 61 is not covered by the second isolating layer 64 and the package layer 63, and is exposed outwardly beyond the second isolating layer 65 and the package layer 63.

The second isolating layer 65 can be in direct physical contact with the light exiting face 612 of the light guiding board 61.

The package layer 63 can be made of package material of thin film. The package layer 63 can have a thickness in a range from about 6 micrometers to about 6 micrometers. The quantum dots layer 62 can have a thickness no more than about 100 micrometers. The first isolating layer 64 can be an isolating film, and has a thickness no more than about 64 micrometers. The second isolating layer 65 can be an isolating film, and has a thickness no more than about 55 micrometers. In at least one embodiment, the first isolating layer 64 can be a passivation layer made of passive material.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A backlight module comprising:
   a light guiding board comprising a light entering face and a light exiting face;
   a light source located adjacent to the light guiding board and facing the light entering face of the light guiding board, the light source being configured to emit light towards the light entering face of the light guiding board; and
   a package layer coupled to the light guiding board;
   wherein the light guiding board and the package layer cooperative define a receiving room receiving a quantum dots layer on the light guiding board; the receiving room further receives an isolating layer; the isolating layer is located between the package layer and the quantum dots layer, and prevents the quantum dots layer from directly contacting the package layer.

2. The backlight module of claim 1, wherein the package layer comprises a main portion located on the quantum dots layer and a periphery portion surrounding the quantum dots layer.

3. The backlight module of claim 2, wherein the periphery portion of the package layer is coupled to the light guiding board.

4. The backlight module of claim 3, wherein the periphery portion of the package layer is directly coupled to the light exiting face of the light guiding board.

5. The backlight module of claim 3, wherein the quantum dots layer is in direct physical contact with the light exiting face of the light guiding board.

6. The backlight module of claim 1, wherein the isolating layer is stacked on the quantum dots layer and located between the main portion of the package layer and the quantum dots layer.

7. The backlight module of claim 1, wherein the isolating layer comprises a main portion stacked on the quantum dots layer and a periphery portion depending from the main portion, the periphery portion of the isolating layer surrounds the quantum dots layer.

8. The backlight module of claim 7, wherein the periphery portion of the isolating layer is located between the periphery portion of the package layer and the quantum dots layer.

9. The backlight module of claim 8, wherein the periphery portion of the isolating layer is directly coupled to the light exiting face of the light guiding board.

10. The backlight module of claim 1 further comprising an additional isolating layer in the receiving room and located between the quantum dots layer and light guiding board.

11. The backlight module of claim 10, wherein the additional isolating layer is in direct physical contact with the light exiting face of the light guiding board.

12. A light guiding configuration comprising:
    a light guiding board comprising a light entering face and a light exiting face;
    a quantum dots layer located at a side of the light exiting face of the light guiding board; and
    a package layer coupled to the light guiding board;
    wherein the light guiding board and the package layer cooperative define a receiving room receiving the quantum dots layer between the package layer and the light guiding board; the receiving room further receives an isolating layer; the isolating layer is located between the package layer and the quantum dots layer, and prevents the quantum dots layer from directly contacting the package layer.

13. The light guiding configuration of claim 12, wherein the package layer comprises a main portion located on the quantum dots layer and a periphery portion surrounding the quantum dots layer.

14. The light guiding configuration of claim 13, wherein the periphery portion of the package layer is coupled to the light guiding board.

15. The light guiding configuration of claim 14, wherein the light exiting face of the light guiding board extends outwards beyond the periphery portion of the package layer.

16. The light guiding configuration of claim 12, wherein the isolating layer is a passivation layer made of passive material.

17. The light guiding configuration of claim 16, wherein the isolating layer has a thickness no more than 55 micrometers.

18. A display device comprising:
- a light source configured to provide light;
- a light guiding board configured to guiding the light from the light source, the light guiding board comprising a light entering face facing the light source and a light exiting face;
- a quantum dots layer located at a side of the light exiting face of the light guiding board;
- an isolating layer located on the quantum dots layer away from the light guiding board;
- a package layer coupled to the light guiding board and enclosing the quantum dots layer and the isolating layer on the light guiding board; and
- a display panel located at a side of the package layer, and configured to receive the light passing through the light guiding board, the quantum dots layer and the package layer;
- wherein the isolating layer is located between the package layer and the isolating layer, and prevents the quantum dots layer from directly contacting the package layer.

19. The backlight module of claim 1, wherein a thickness of the package layer ranges from 4 micrometers to about 5 micrometers.

20. The light guiding configuration of claim 12, wherein a thickness of the package layer ranges from 4 micrometers to about 5 micrometers.

\* \* \* \* \*